US008360781B2

(12) United States Patent
Gorman et al.

(10) Patent No.: US 8,360,781 B2
(45) Date of Patent: Jan. 29, 2013

(54) HAZARDOUS MATERIAL RESPONSE SYSTEM, METHOD OF USING SAME AND METHOD OF TRAINING FOR SAME

(75) Inventors: Joseph Gorman, Winchester, VA (US); Cristobal Aguirre, Miami, FL (US)

(73) Assignee: Hazmat IQ, LLC., Miami, FL (US)

( * ) Notice: Subject to any disclaimer, the term of this patent is extended or adjusted under 35 U.S.C. 154(b) by 1015 days.

(21) Appl. No.: 12/349,384

(22) Filed: Jan. 6, 2009

(65) Prior Publication Data

US 2010/0047749 A1 Feb. 25, 2010

Related U.S. Application Data

(60) Provisional application No. 61/088,658, filed on Aug. 13, 2008.

(51) Int. Cl.
*G09B 19/00* (2006.01)
(52) U.S. Cl. ..................................... 434/219
(58) Field of Classification Search ................ 434/218, 434/219, 226, 276, 281, 282, 298
See application file for complete search history.

(56) References Cited

U.S. PATENT DOCUMENTS

| 5,537,752 | A  | * | 7/1996  | Cornwell et al. | 33/1 SB |
|-----------|----|---|---------|-----------------|---------|
| 5,644,693 | A  | * | 7/1997  | Fitzgerald et al. | 715/835 |
| 6,027,344 | A  | * | 2/2000  | Johanns et al.  | 434/219 |
| 6,033,225 | A  | * | 3/2000  | Pike            | 434/218 |
| 6,839,609 | B2 | * | 1/2005  | Rice, Jr.       | 700/227 |
| 7,684,966 | B1 | * | 3/2010  | Genovese        | 703/6 |
| 7,933,879 | B2 | * | 4/2011  | Ouzounian       | 707/694 |
| 2004/0204790 | A1 | * | 10/2004 | Rice, Jr.    | 700/227 |
| 2004/0224293 | A1 | * | 11/2004 | Penning et al. | 434/219 |
| 2005/0147949 | A1 | * | 7/2005  | Wilson       | 434/219 |
| 2008/0071396 | A1 | * | 3/2008  | Quandel et al. | 700/49 |
| 2008/0221965 | A1 | * | 9/2008  | Riddle       | 705/9 |
| 2009/0125460 | A1 | * | 5/2009  | Hewison et al. | 706/11 |

* cited by examiner

*Primary Examiner* — Kurt Fernstrom
(74) *Attorney, Agent, or Firm* — Mintz, Levin, Cohn, Ferris, Glovsky and Popeo P.C.

(57) ABSTRACT

This application describes methods for responding to a hazardous material based upon properties of the hazardous material based on its name. This application also describes methods of teaching hazardous material responders how to use the method of responding to a hazardous material based upon properties of the hazardous material based on its name.

19 Claims, 6 Drawing Sheets

Fig. 3

RESEARCH FORM

CHEMICAL NAME: ☐ Above ☐ Below

Properties

Vapor Pressure:

Flash Point:

LEL - UEL:

Corrosivity:

Molecular Weight:

Solubility

Ionizing Potential:

Polymerization:

HEALTH

TWA - PEL REL:

Exposure Routes:

REACTIVITIES

Peroxide Formation:

METERS

| | |
|---|---|
| CGI: | PID: |
| Halogen Meter: | FID: |
| pH / KI paper: | Temp. Gun: |
| Colormeteric Tubes or Chips: | Radiological: |

PPE

| Level A | Level B | Turn Out with SCBA |
|---|---|---|
| ALWAYS BELOW LEL | ALWAYS BELOW LEL | ALWAYS BELOW LEL |
| Corrosive gas | Solid or liquid | Solid, liquid or |
| and / or | | gases that are |
| Skin-absorbable gas | | not skin-absorbable or corrosive |

Fig. 6

HAZARDOUS MATERIAL RESPONSE SYSTEM, METHOD OF USING SAME AND METHOD OF TRAINING FOR SAME

BACKGROUND OF THE INVENTION

First responders must make rapid decisions in life-saving and life-threatening situations when dealing with hazardous materials that have been improperly released into the environment. This is especially true now with the threat of international terrorism. Prior to dealing with an actual terrorist or other incident involving suspected or known chemical hazards, emergency personnel must be adequately trained to properly react to the various types of hazardous events, for both their safety as well as public safety.

Given this, the incident commander must rapidly process information during a hazardous incident and make the appropriate decisions for action based upon his own cognitive abilities to mentally process such information with or without the help of subordinates. Although training manuals and field manuals may be available, timely access and processing of this information remains elusive, and decisions made on this less-than-optimal information may prove detrimental. Importantly, the known detection methods give the responder a variety of information, however the key is to understand is what you are using and why and to have a quick and efficient method of risk assessment of an chemical incident in minutes.

Hazardous Material (HazMat) Responders experience "information overload" that often results in responders over analyzing available research material causing incidents to be time-consuming, extremely costly, and labor intensive. Implementing change in existing methods to make efficient risk based decisions on virtually any chemical incident in minutes creates tremendous opportunities and dramatic challenges, often concurrently. There exists a need in the art for novel methods of quick risk assessment of chemical incident in the civil and combat situations. There is a need to integrate the required functional elements in order to respond adequately to a terrorist threat or chemical incident involving suspected or known chemical hazards.

The description herein of disadvantages and problems associated with known methods is in no way intended to limit the scope of the embodiments described in this document to their exclusion. Indeed, certain embodiments may include one or more known methods or method steps without suffering from the so-noted disadvantages or problems.

SUMMARY OF THE INVENTION

It is an object of the present invention to provide a method of rapid risk assessment of virtually any hazardous material emergency. The instant specification discloses techniques that allow for the rapid classification of hazardous materials in order to enable efficient and adequate response to a hazardous material emergency.

It is an object of the present invention to provide a method of training a user to respond to a hazardous material emergency comprising providing in a fixed medium a representation separating two or more elements of the periodic chart into a first group or a second group, wherein the first group of elements are chemical constituents of hazardous materials that possess one or more of the following properties: solid, not flammable, no lower explosive limit (LEL), no upper explosive limit (UEL), no flashpoint, no ionizing potential, alkaline, and high pH; and wherein the second group of elements are chemical constituents of hazardous materials that possess one or more of the following properties: liquid or gas, flammable, LEL-UEL, flashpoint, ionizing potential, acidic, and low pH; and directing the user to respond to the hazardous material in a solid state when the first word of the name of the hazardous material is an element recited in the first group, or directing the user to respond to the hazardous material in a liquid or gaseous state when the first word of the name of the hazardous material is an element recited in the second group. The first group of elements preferably comprises two or more of the following: lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium. The first group may further comprise one or more of the following moieties: nitride, phosphide, carbide, and hydride. The second group of elements preferably comprises two or more of the following: hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

It is an object of the present invention to provide a method of responding to a hazardous material emergency comprising providing in a fixed medium a representation separating two or more elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium and/or two or more moieties selected from the group consisting of nitride, carbide, hydride, and phosphide into a first group, and two or more elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon into a second group.

According to some embodiments, the method further comprises analyzing the name of a hazardous material to determine whether a first word in the name of the hazardous material is an element recited in the first group, or whether a second word in the name of the hazardous material is a chemical moiety recited in the first group, or whether the first word in the name of the hazardous material is an element recited in the second group.

According to some embodiments, the instant method further directs a hazardous material responder to respond to the hazardous material in a solid state when the first word of the name of the hazardous material is an element recited in the first group or the second name is a chemical moiety recited in the first group.

According to some embodiments, the method directs the hazardous material responder to respond to the hazardous material in a liquid or gaseous state when the first word of the name of the hazardous material is not an element recited in the first group, or when the second name of the hazardous material is not a chemical moiety recited in the first group, or when the first name of the hazardous material is an element recited in the second group.

In one preferred embodiment, the method of responding to a hazardous material emergency involves the use of a fixed medium that is a periodic chart of the elements in which a marking is made separating elements lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

In another preferred embodiment, the fixed medium includes a list of elements consisting of at least five members of the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In a further preferred embodiment, the fixed medium includes a list of elements consisting of at least ten members of the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In yet another preferred embodiment, the fixed medium comprises a list of elements consisting of at least twenty members of the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In one embodiment, the method of responding to a hazardous material emergency comprises a representation separating elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium, and moieties selected from the group consisting of nitride, carbide, hydride and phosphide into a first group, and elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon into a second group.

In one preferred embodiment, the representation separates five or more elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium, and/or two or more moieties selected from the group consisting of nitride, carbide, hydride, and phosphide into a first group, and five or more elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon into a second group.

In another preferred embodiment, the representation separates ten or more elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium, and ten or more elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon into a second group.

In another preferred embodiment, a method of responding to a hazardous material emergency is provided that comprises analyzing the name of a hazardous material, and where the first word of the name of the hazardous material is an element recited in the first group, or where the second name is a chemical moiety recited in the first group, a hazardous material responder responds, or is directed to respond, to a non-flammable hazardous material. The method may also comprise analyzing the name of a hazardous material, and where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a flammable hazardous material.

In another embodiment, a method of responding to a hazardous material emergency is provided that comprises analyzing the name of a hazardous material, and where the first word of the name of the hazardous material is an element recited in the first group or where the second name is a chemical moiety recited in the first group, a hazardous material responder responds, or is directed to respond, to a hazardous material without an upper or lower explosive level. In a further embodiment, where the first word of the name of the hazardous material is not an element recited in the first group, or where the second name of the hazardous material is not a chemical moiety recited in the first group, or where the first name of the hazardous material is an element recited in the second group the hazardous material responder responds, or is directed to respond, to a hazardous material with an upper or lower explosive level.

In another embodiment, a method of responding to a hazardous material emergency is provided that comprises analyzing the name of a hazardous material, and where the first word of the name of the hazardous material is an element recited in the first group, or where the second name is a chemical moiety recited in the first group, a hazardous material responder responds, or is directed to respond, to a hazardous material without a flashpoint. In a further embodiment, where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a hazardous material with a flashpoint.

In yet another embodiment, a method of responding to a hazardous material emergency is provided that comprises analyzing the name of a hazardous material, and where the first word of the name of the hazardous material is an element recited in the first group, or where the second name is a chemical moiety recited in the first group, a hazardous material responder responds, or is directed to respond, to a hazardous material without an ionization potential. In a further embodiment, where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a hazardous material with an ionization potential.

In yet another embodiment, a method of responding to a hazardous material emergency is provided that comprises analyzing the name of a hazardous material, and where the first word of the name of the hazardous material is an element recited in the first group, or where the second name is a chemical moiety recited in the first group, a hazardous material responder responds, or is directed to respond, to a hazardous material is a base. In a further embodiment, where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a hazardous material is an acid.

In another embodiment, a method of responding to a hazardous material emergency is provided that comprises analyzing the name of a hazardous material, and where the first word of the name of the hazardous material is an element recited in the first group or the second name is a chemical moiety recited in the first group, a hazardous material responder responds, or is directed to respond, to a hazardous material with exposure limits expressed in mg/m$^3$. In another embodiment, when the first word of the name of the hazardous material is not an element recited in the first group, or when the second name of the hazardous material is not a chemical moiety recited in the first group, or when the first name of the hazardous material is an element recited in the second group, the hazardous material responder responds, or is directed to respond, to a hazardous material with exposure limits expressed in ppm.

In yet another embodiment, a method of responding to a hazardous material emergency is provided that comprises analyzing the name of a hazardous material, and where the first word of the name of the hazardous material is an element recited in the first group or the second name is a chemical moiety recited in the first group, a hazardous material responder responds, or is directed to respond, to a hazardous material with an initial isolation of 75 feet if in solid form and 150 feet if in solution. In a further embodiment, where the first word of the name of the hazardous material is not an element recited in the first group, or where the second name of the hazardous material is not a chemical moiety recited in the first group, or where the first name of the hazardous material is an element recited in the second group, the hazardous material responder responds, or is directed to respond, to a hazardous material with an initial isolation of 150 feet if liquid or 300 feet if a gas.

In a further embodiment, a method of responding to a hazardous material emergency of the present invention is provided, which may comprise providing in a second fixed medium a representation listing second names of hazardous materials, wherein a first word of the name of the hazardous material is an element recited in the first group or the second name is a chemical moiety recited in the first group, wherein the representation shows at least one property of the hazardous material having each second name and appropriate tests to evaluate risk associated with the hazardous material. The method further includes matching the second name of the hazardous material with the representation and performing the appropriate tests on the hazardous material.

In one embodiment, the at least one property shown in the representation on the second fixed medium is selected from the group consisting of state of matter, flammability, explosive limits, flashpoint, ionizing potential, pH, exposure limit units and initial isolation.

It is yet another object of the present invention to provide a method of responding to a hazardous material emergency comprising performing a test for the presence or absence of the at least one physical property of the hazardous material wherein the test is selected from the group consisting of flammability, existence of explosive limits, existence of flashpoint, existence of ionizing potential, and acidic or basic pH, wherein if the test shows that the hazardous material is flammable, has explosive limits, has a flashpoint, has an ionization potential, or is acidic, a user is directed to be equipped with Level A personal protection equipment (PPE), and wherein if the test shows that the hazardous material is not flammable, has no explosive limits, has no flashpoint, has no ionization potential or is basic, the user is directed to be equipped with Level B PPE.

In one embodiment, the test shows whether or not the hazardous material is flammable. In another embodiment, the test shows whether or not the hazardous material has explosive limits. In yet another embodiment, test shows whether or not the hazardous material has a flashpoint. In yet another embodiment, the test shows whether or not the pH of the hazardous material. In yet another embodiment, the test shows whether or not the hazardous material has an ionizing potential.

The present invention also provides a chart for responding to a hazardous material emergency. In one embodiment, a chart in a fixed medium shows a periodic table of the elements with a mark separating lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon. In one embodiment, the fixed medium is a printed page. In a further embodiment, the printed page is laminated.

In another embodiment, the fixed medium is electronic. In some preferred embodiments, the electronic fixed medium is selected from the group consisting of a computer monitor, a television monitor, a cell phone monitor, and a personal digital assistant monitor.

It is another object of the present invention to provide the chart for responding to a hazardous material emergency wherein the mark is a line drawn to separate lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon on the periodic table of elements.

In one embodiment, the mark is contrasting backgrounds in squares on the periodic table of the elements separating lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

It is yet another object of the present invention to provide a chart for responding to a hazardous material emergency wherein a chart is in a fixed medium separating at least two elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from at least two elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

In one embodiment of the present invention, the chart consists of a list of at least two elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In another embodiment of the present invention, the chart consists of a list of at least ten elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In yet another embodiment of the present invention, the chart consists of a list of at least twenty elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In yet another embodiment of the present invention, the chart consists of a list of elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

In yet another embodiment of the present invention, the chart consists of a list of at least two elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

In another embodiment, the chart consists of a list of at least ten elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

In yet another embodiment, the chart consists of a list of elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

BRIEF DESCRIPTION OF THE DRAWINGS

FIG. 3 shows a chart indicating which elements and chemical moieties are "above the line" or "below the line".

FIG. 6 shows a research form providing a framework to capture critical properties and characteristic found in other documentation.

DETAILED DESCRIPTION OF THE INVENTION

Figure 1:
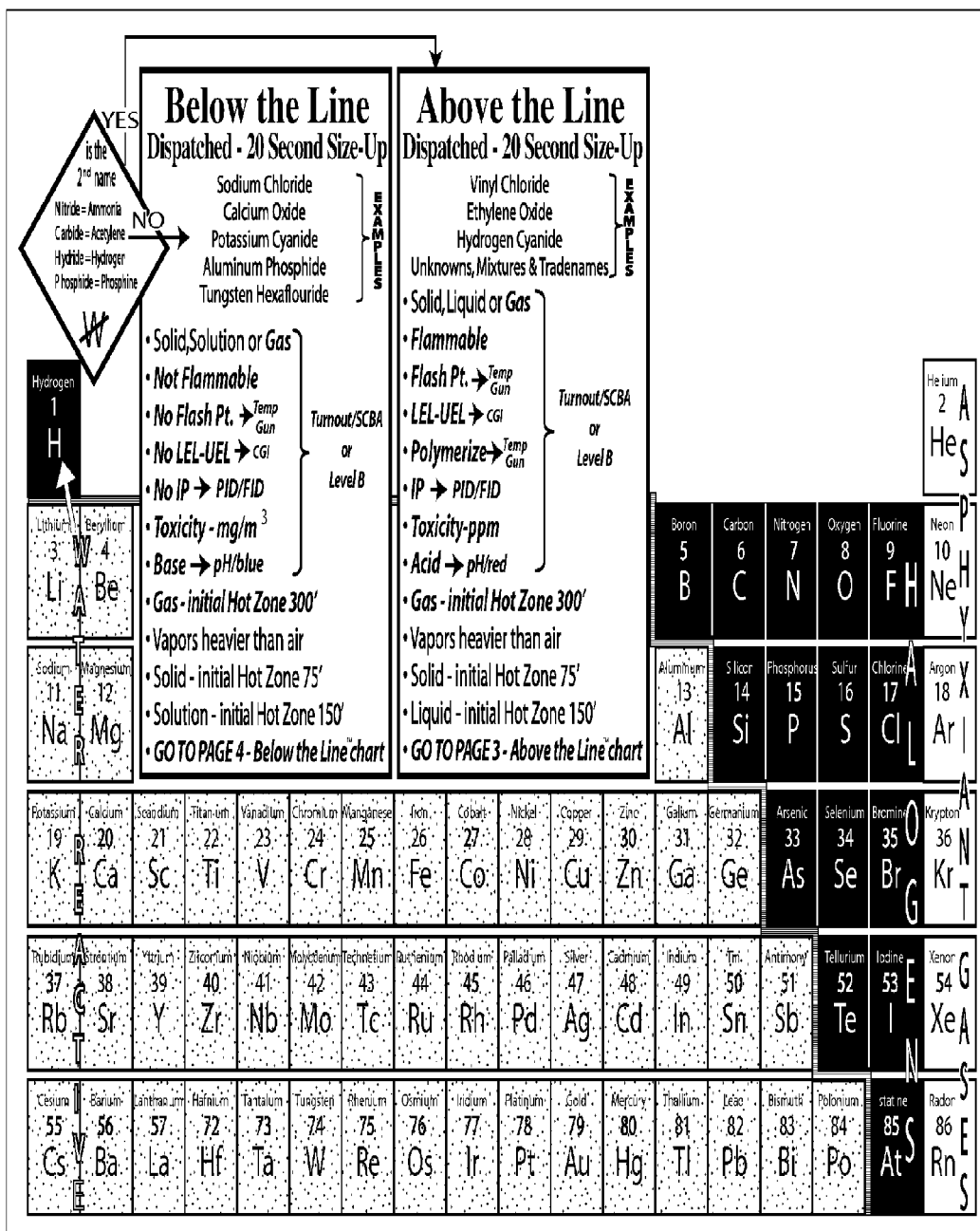
FIG. 1 provides an illustration of an embodiment of the hazardous material response method of the invention in four steps.

Before the present methods are described, it is understood that this invention is not limited to the particular methodology, protocols, and reagents described, as these may vary. It also is to be understood that the terminology used herein is for the purpose of describing particular embodiments only, and is not intended to limit the scope of the present invention that will be limited only by the appended claims.

Definitions

For the purposes of promoting an understanding of the embodiments described herein, reference will be made to preferred embodiments and specific language will be used to describe the same. The terminology used herein is for the purpose of describing particular embodiments only, and is not intended to limit the scope of the present invention. As used throughout this disclosure, the singular forms "a," "an," and "the" include plural reference unless the context clearly dictates otherwise. Thus, for example, a reference to "a chemical" includes a plurality of such chemicals, as well as a single chemical.

As used herein, the following acronyms have the following meanings: LEL for Lower Explosive Limit; UEL for Upper Explosive Limit; Fl.P for Flash Point; IDLH for Immediately Dangerous to Life and Health; IP for Ionization Potential; MW for Molecular weight; HazMat for Hazardous Materials; and ER for Exposure Routes.

The explosive limit of a gas or a vapor, is the limiting concentration (in air) that is needed for the gas to ignite and explode. There are two explosive limits for any gas or vapor: the lower explosive limit (LEL) and the upper explosive limit (UEL). At concentrations in air below the LEL there is not enough fuel to continue an explosion; at concentrations above the UEL the fuel has displaced so much air that there is not enough oxygen to begin a reaction.

Personal Protection Equipment (PPE) is used by HazMat responders when they are called to respond to a HazMat emergency. There are three levels of PPE commonly used by HazMat responders; Turnout gear, Level A, and Level B. Turnout gear is equipment usually used by firefighters when responding to a fire. Turnout gear generally includes waterproof and otherwise protective jacket and pants as well as a helmet. Level A is used when the greatest level of skin, respiratory, and eye protection is required. Level A equipment may include, but is not limited to, the following: a positive pressure, full face-piece self-contained breathing apparatus (SCBA), or positive pressure supplied air respirator with escape SCBA; a totally-encapsulating chemical-protective suit including coveralls, long underwear, gloves and boots; a hard hat and optionally a disposable protective suit, gloves and boots which may be worn over totally-encapsulating suit. Level B provides the highest level of respiratory protection is necessary but a lesser level of skin protection. Level B equipment may include, but is not limited to, the following: a positive pressure, full face-piece self-contained breathing apparatus (SCBA), or positive pressure supplied air respirator with escape SCBA; hooded chemical-resistant clothing including overalls and long-sleeved jacket; coveralls; one or two-piece chemical-splash suit; and optionally disposable chemical-resistant overalls; gloves; boots; boot-covers; a hard hat and face shield.

The HazMat Response System

FIG. 1 shows a schematic summarizing how the HazMat Response System of the invention works. If the chemical name of the material being analyzed is known, then the system is used as represented from the left side of the schematic. If not, it is begun at the right side of the schematic. We first describe how the HazMat Response System works when the chemical name is known.

Figure 2:
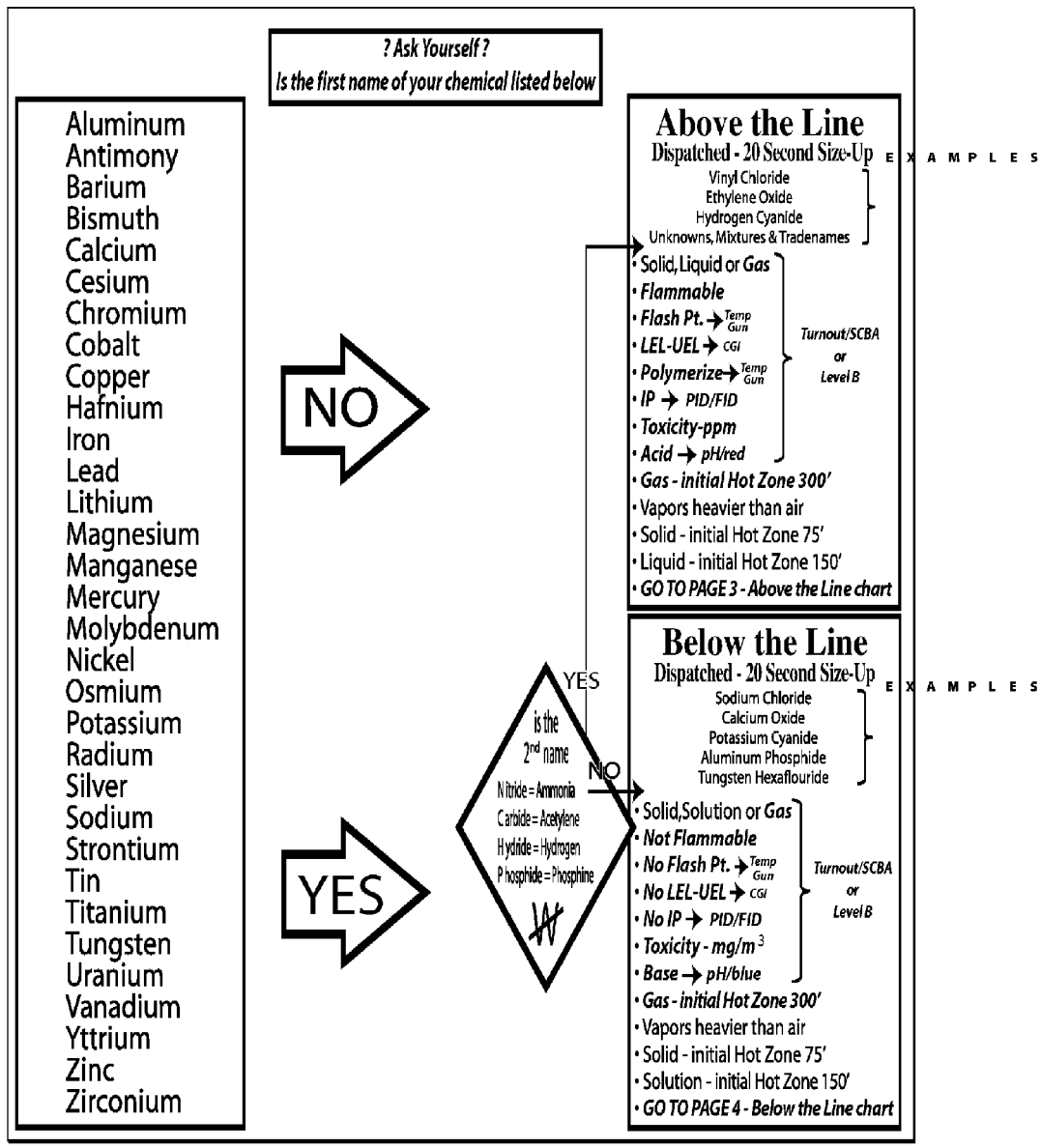
FIG. 2 shows a chart indicating which elements and chemical moieties are "above the line" or "below the line".
Figure 3:
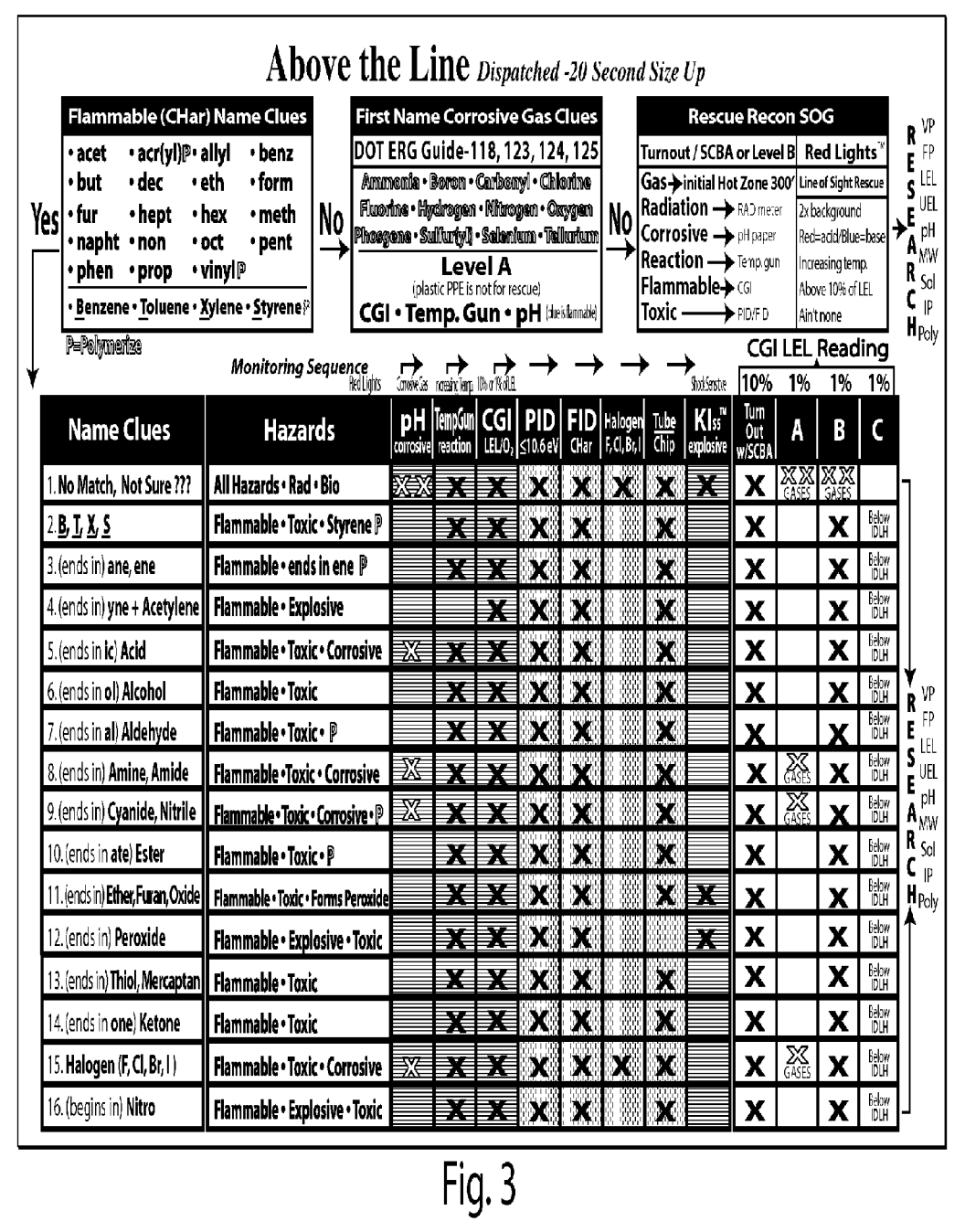

As shown in FIG. 1, the first step is to use the information conveyed by the proprietary "Smart Chart" of the HazMat Response System of the invention. (FIG. 2). In one embodiment, this information is contained in the "Smart Chart" as shown in FIG. 2. In other embodiments, this information is contained in other fixed media allowing a HazMat responder to quickly determine at the scene of a HazMat emergency if the material is "above the line" or "below the line". An example of one other such fixed medium is shown in FIG. 3. These fixed media are also able to be used electronically. Thus, these representations of elements and chemical moieties being above and below the line are also shown on computer, cell phone or personal digital assistant (PDA). These fixed media need not separate all of the listed elements into two groups. In some embodiments of the invention, only the most commonly encountered elements and/or chemical moieties need to be represented in the fixed medium. The fixed medium may list any number of elements from two elements or fixed moieties to all of them. Examples of numbers of elements of moieties represented include 2, 5, 10, 15, 20, 25, 50, 60, 70, 80, 90 and 100.

The "line" is indicated on the periodic table of elements shown in FIG. 2. The materials with elements in their first names, shown below the heavy marking, are considered "below the line". Also materials that have one of the four chemical moieties in the diamond above the periodic table of elements in their second name are also considered "below the line". The elements that are considered "below the line" are lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium. The chemical moieties that are considered "below the line" are nitride (ammonia), carbide (acetylene), hydride (hydrogen) and phosphide (phosphine). Materials that are classified as "below the line" include those that, generally, are solid at room temperature, are non-flammable, have no LEL or UEL, have no flashpoint, no ionizing potential, and are bases. For these materials, the units used to measure their exposure limits e.g. their immediately dangerous to life and health (IDLH) level or permissible exposure limits (PELs) are mg/m$^3$. The materials with elements in their first name, shown above the heavy marking, are considered "above the line". The elements that are considered "above the line" are hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon. Materials that are classified as "below the line" include those that are liquids or gases, are flammable, have LEL and UEL, a flashpoint, an ionizing potential and are acids. For these materials, the units used to measure their exposure limits e.g. their immediately dangerous to life and health (IDLH) level or permissible exposure limits (PELs) are parts per million (ppm).

Based on the information provided by a material being classified as above or below the line, personnel responding to a HazMat situation can quickly determine the initial PPE necessary for the material. If a material is classified as "above the line" a Level B PPE is generally necessary, while with materials classified as "below the line" a Level A PPE is generally necessary. Moreover, the initial isolation zone for a material classified as "above the line" is generally a 75 feet radius, while a material classified as "below the line" generally has an initial isolation zone of a 150 feet radius if it is a liquid and of 300 feet if it is a gas.

Figure 4:
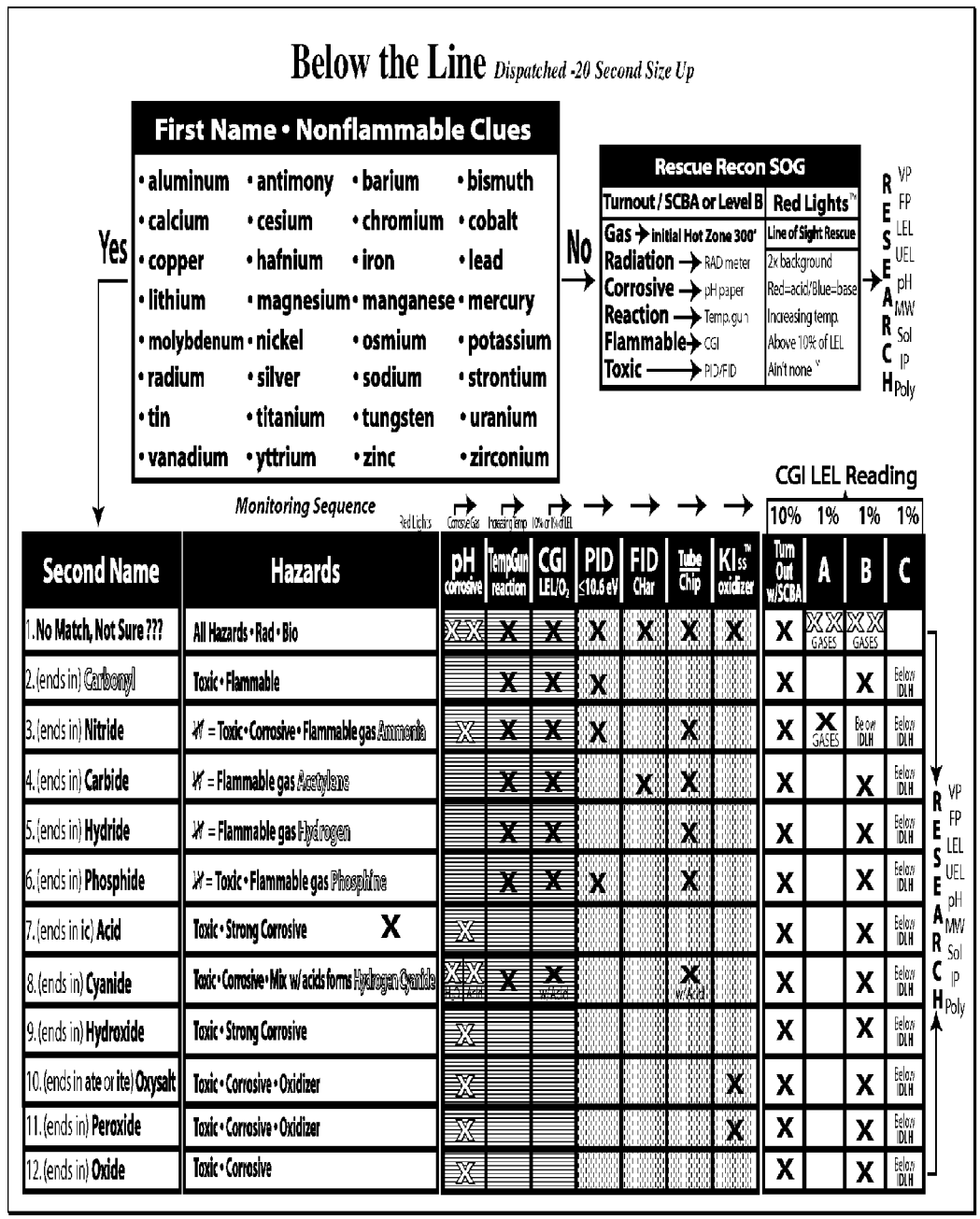
FIG. 4 shows a chart indicating potential hazards and appropriate tests for hazardous materials based upon the second word in the hazardous material name for hazardous materials classified as "above the line".
Figure 5:
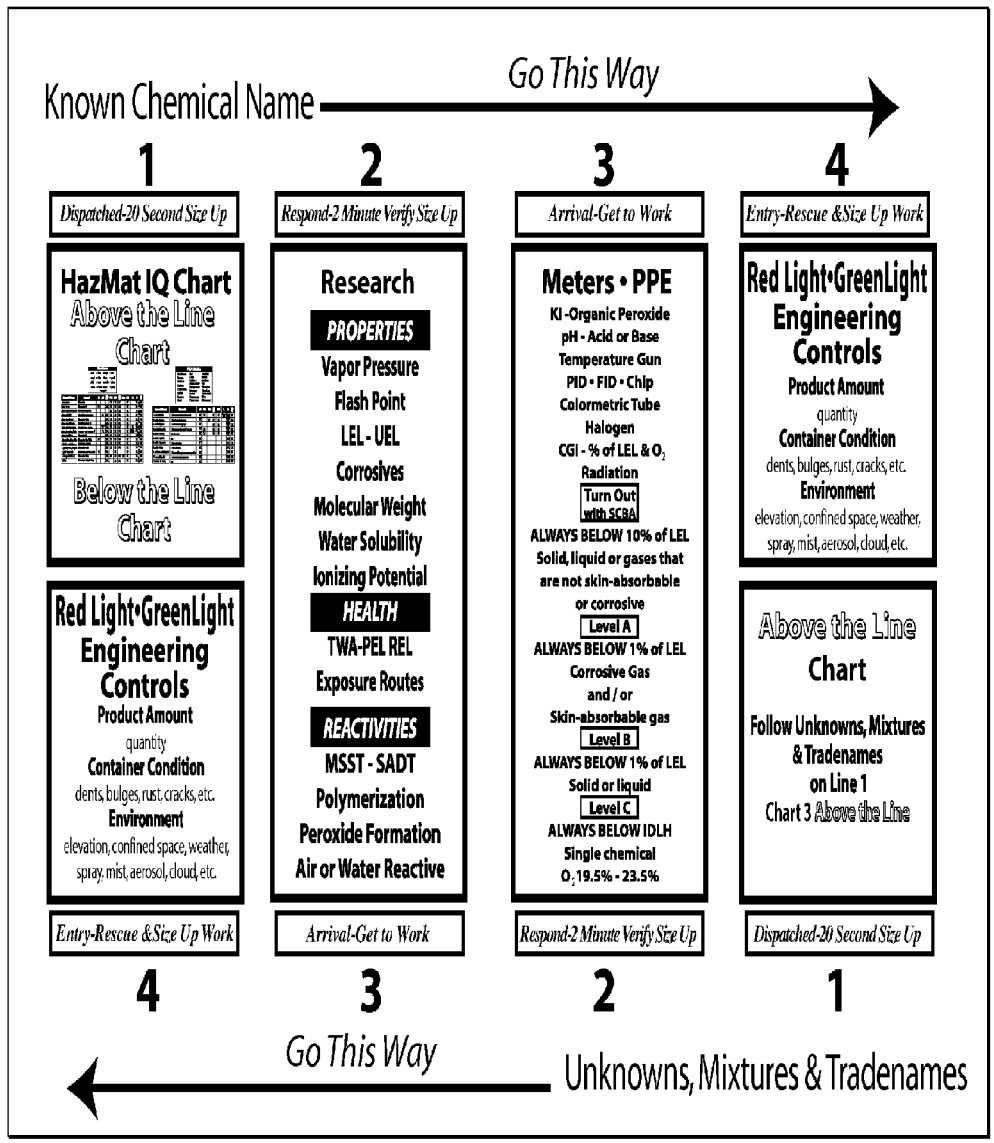
FIG. 5 shows a chart indicating potential hazards and appropriate tests for hazardous materials based upon the second word in the hazardous material name for hazardous materials classified as "below the line".

Additional information can then be acquired to deal with the hazardous material after a perimeter has been created. For example, for materials classified as "above the line" additional tests can be performed based on the ending of the second name of the material. FIG. 4 shows tests that are used to detect the concentration of hazardous material and the associated hazard. These tests include potassium iodide (KI) tests to detect oxidants, tests of pH, tests for toxic industrial chemicals (TIC), tests involving photoionization detectors (PID), flame ionization detectors (FID), tube chips used to detect various biological hazards, and combustible gas indicators (CGI). For materials classified as "below the line" different tests can be performed based on the ending of the second name of the material. FIG. 5 shows tests that are used to detect the concentration of hazardous material and the associated hazard.

In other embodiments of the HazMat Response System of the invention, the four step system can be used in reverse if the name of the compound is not known. Upon entering a the site of a HazMat emergency, a HazMat responder may not know what the hazardous material is, and whether it is above or below the line. Because of the differences between hazardous materials that are above or below the line, a HazMat responder can perform any one of a number of simple tests to determine whether a hazardous material is a solid or gas. If the HazMat is a solid then Level A PPE should be used to protect HazMat responder personnel, whereas with a gas or liquid, Level B is used. The tests shown above in FIGS. 3 and 4 can be used to ascertain what hazardous material is present and what sort of response should be made to the hazardous material.

The invention also provides methods of training HazMat responders to use the HazMat Response System of the invention. The training includes familiarizing HazMat responders with the fixed media that are used to quickly ascertain whether a hazardous material is "above" or "below the line". This familiarization is performed by providing for the HazMat responders to be trained a copy of one or more fixed media used to quickly ascertain whether a hazardous material is "above" or "below the line" and instructing them how to use the media. These fixed media can be any of those described herein, including representations as shown in FIGS. 2 and 3. The training further includes familiarizing HazMat responders with fixed media showing selected physical properties of hazardous materials and tests that should be performed to characterize the threat posed by these materials. Examples of such fixed media are shown in FIGS. 4 and 5, herein.

EXAMPLES

Example 1

Determination of Hazard Information for Hazardous Materials

The HazMat Response System of the invention is used to respond to any hazardous material. Below, example of various materials and how the system indicates to respond to them are shown.

Calcium oxide would be considered to be "below the line" using the HazMat response system of the invention, because the name "calcium" is in the first name of the material. This shows to a HazMat responder that this material is a solid, it is not flammable, it has no LEL, it has no flashpoint or ionization potential, it is a base, the IDLH or PEL is measured in $mg/m^3$ and that the initial isolation is 75 feet. Based on having "oxide" in the second name of the material, the HazMat responder would also know to test pH because the material generally acts as a weak base. (FIG. 4). The HazMat responder would also know to use a PPE of Level B.

Potassium cyanide would also be considered to be "below the line" using the HazMat response system of the invention, because the name "potassium" is in the first name of the material. As above, for calcium oxide, this shows to a HazMat responder that this material is a solid, it is not flammable, it has no LEL, it has no flashpoint or ionization potential, it is a base, the IDLH or PEL is measured in $mg/m^3$ and that the initial isolation is 75 feet. Based on having "cyanide" in the second name of the material, the HazMat responder would also know to test pH, test with a tube chip and CGI to determine the amount of potassium cyanide present because of the toxicity of the substance. (FIG. 4). The HazMat responder would also know to use a PPE of Level B.

Vinyl chloride would be considered to be "above the line" using the HazMat response system of the invention, because the name "vinyl" is not one of the names present "below the line". The HazMat response system of the invention shows to a HazMat responder that this material is a liquid or gas, it is flammable, it has an LEL and UEL to consider, it has a flashpoint and ionization potential to consider, it is an acid, the IDLH or PEL is measured in ppm and that the initial isolation is 150 feet if a liquid and 300 feet if a gas. Based on having "chloride" in the second name of the material, the HazMat responder would also know to test with a TIC, a PID, an FID, a tube chip and a CGI to acquire a concentration of the material to because it has the potential to be toxic and flammable. (FIG. 3). The HazMat responder would also know to use a PPE of Level A.

Ethylene oxide would also be considered to be "above the line" using the HazMat response system of the invention, because the name "ethlyene" is not one of the names present "below the line". The HazMat response system of the invention shows to a HazMat responder that this material, like vinyl chloride, is a liquid or gas, it is flammable, it has an LEL and UEL to consider, it has a flashpoint and ionization potential to consider, it is an acid, the IDLH or PEL is measured in ppm and that the initial isolation is 150 feet if a liquid and 300 feet if a gas. Based on having "oxide" in the second name of the material, the HazMat responder would also know to test with a TIC, a PID, an FID, a tube chip and a CGI to acquire a concentration of the material to because it has the potential to be flammable. (FIG. 3). The HazMat responder would also know to use a PPE of Level A.

Hydrogen cyanide would also be considered to be "above the line" using the HazMat response system of the invention, because the name "hydrogen" is not one of the names present "below the line". The HazMat response system of the invention shows to a HazMat responder that this material, like vinyl chloride, is a liquid or gas, it is flammable, it has an LEL and UEL to consider, it has a flashpoint and ionization potential to consider, it is an acid, the IDLH or PEL is measured in ppm and that the initial isolation is 150 feet if a liquid and 300 feet if a gas. Based on having "cyanide" in the second name of the material, the HazMat responder would also know to test for pH and with a TIC, a PID, an FID, a tube chip and a CGI to acquire a concentration of the material to because it has the potential to be toxic, corrosive and flammable. (FIG. 3). The HazMat responder would also know to use a PPE of Level A.

We claim:

1. A method comprising
determining, as part of a response to a hazardous material emergency involving at least one hazardous material, a chemical name of the at least one hazardous material;
obtaining information relating to the at least one hazardous material from a representation separating a first group of elements and a second group of elements listed on the representation and separated by a line, the representation being provided in fixed medium, the first group comprising two or more elements or chemical moieties selected from lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium nitride, carbide, hydride and phosphide, the second group comprising group and two or more elements selected from hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon;
determining whether a first word in the chemical name appears in the first group on the representation, whether a second word in the chemical name appears in the first group, or whether the first word in the chemical name appears in the second group on the representation;
responding to the hazardous material emergency according to a first method when the first word appears in the first group or the second word appears in the first group, the first method comprising outfitting a responder to the hazardous material emergency with protective equipment comprising a totally-encapsulating chemical-protective suit; and
responding to the hazardous material emergency according to a second method when the first word does not appear in the first group, the second word does not appear in the first group, or the first word appears in the second group, the second method comprising outfitting a responder to the hazardous material emergency with protective equipment comprising hooded chemical-resistant clothing.

2. The method of claim 1, wherein the representation comprises a periodic chart of the elements and the line separates elements in the first group comprising lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium from elements in the second group comprising hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

3. The method of claim 1, wherein the first group comprises a list of elements consisting of at least five of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

4. The method of claim 1, wherein the first group comprises a list of elements consisting of at least ten of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

5. The method of claim 1, wherein the first group comprises a list of elements consisting of at least twenty of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium.

6. The method of claim 1, wherein the line separates the first group comprising five of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium and two of nitride, carbide, hydride and phosphide from the second group comprising five or more of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

7. The method of claim 1, wherein the line separates the first group comprising ten of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium and the second group comprising ten o of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

8. The method of claim 1, wherein the line separates the first group comprising lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium and moieties selected from the group consisting of nitride, carbide, hydride and phosphide from the second group comprising hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

9. The method of claim 1, further comprising identifying the hazardous material as non-flammable when at least one of the first word and the second word appears in the first group; and identifying the hazardous material as flammable when neither of the first word and the second word appears t in the first group or when the first word appears in the second group.

10. The method of claim 1, further comprising identifying the hazardous material as lacking at least one of an upper explosive level and a lower explosive level when at least one of the first word and the second word appears in the first group; and identifying the hazardous material as having at least one of an upper explosive level and a lower explosive level when neither of the first word and the second word appears t in the first group or when the first word appears in the second group.

11. The method of claim 1, further comprising identifying the hazardous material as lacking a flashpoint when at least one of the first word and the second word appears in the first group; and identifying the hazardous material as having a flashpoint when neither of the first word and the second word appears t in the first group or when the first word appears in the second group.

12. The method of claim 1, further comprising identifying the hazardous material as lacking an ionization potential when at least one of the first word and the second word appears in the first group; and identifying the hazardous material as having an ionization potential when neither of the first word and the second word appears t in the first group or when the first word appears in the second group.

13. The method of claim 1, further comprising identifying the hazardous material as comprising a base when at least one of the first word and the second word appears in the first group; and identifying the hazardous material as comprising an acid when neither of the first word and the second word appears t in the first group or when the first word appears in the second group.

14. The method of claim 1, further comprising identifying the hazardous material with exposure limits expressed in mg/m$^3$ when at least one of the first word and the second word appears in the first group; and identifying the hazardous material with exposure limits expressed in ppm when neither of the first word and the second word appears t in the first group or when the first word appears in the second group.

15. The method of claim 1, further comprising identifying the hazardous material requiring an initial isolation of 75 feet if in solid form and 150 feet if in solution when at least one of the first word and the second word appears in the first group; and identifying the hazardous material requiring an initial isolation of 75 feet if a solid, 150 feet if a liquid or 300 feet if a gas when neither of the first word and the second word appears t in the first group or when the first word appears in the second group.

16. The method of claim 1, further comprising (c) providing in a second fixed medium a second representation listing second names of hazardous materials wherein a first word of the name of the hazardous material is an element recited in the first group or the second name is a chemical moiety recited in the first group, wherein the representation shows at least one property of the hazardous material having each second name and appropriate tests to evaluate risk associated with the hazardous material;

(d) matching the second name of the hazardous material with the representation and performing the appropriate tests on the hazardous material.

17. The method of claim 16, wherein the at least one property is selected from the group consisting of state of matter, flammability, explosive limits, flashpoint, ionizing potential, pH, exposure limit units, and initial isolation.

18. A method comprising:

providing, in a fixed medium, a representation separating two or more elements of the periodic chart into a first group and a second group, wherein the first group of elements comprise chemical constituents of hazardous materials that possess one or more of the following properties: solid, not flammable, no LEL, no flashpoint, no ionizing potential, alkaline, and high pH, and wherein the second group of elements comprise chemical constituents of hazardous materials that possess one or more of the following properties: liquid or gas, flammable, LEL-UEL, flashpoint, ionizing potential, acidic, and low pH; and causing a user to respond to a hazardous material emergency according to a first method when a first word of a name of a hazardous material involved in the hazardous material emergency appears in the first group on the representation, or causing the user to respond to the hazardous material according to a second method when the first word of the name of the hazardous material appears in the second group on the representation, the first method comprising outfitting a responder to the hazardous material emergency with protective equipment comprising a totally-encapsulating chemical-protective suit, and the second method comprising outfitting a responder to the hazardous material emergency with protective equipment comprising hooded chemical-resistant clothing.

19. The method of claim 18, wherein the first group of elements comprises two or more elements selected from the group consisting of lithium, sodium, potassium, rubidium, cesium, beryllium, magnesium, calcium, strontium, barium, scandium, yttrium, lanthanum, titanium, zirconium, hafnium, vanadium, nobelium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, aluminum, gallium, indium, thallium, germanium, tin, lead, antimony, bismuth, and polonium; and the second group of elements comprises two or more elements selected from the group consisting of hydrogen, boron, carbon, silicon, nitrogen, phosphorus, arsenic, oxygen, sulfur, selenium, tellurium, fluorine, chlorine, bromine, iodine, astatine, helium, neon, argon, krypton, xenon, and radon.

\* \* \* \* \*